United States Patent Office 3,502,746
Patented Mar. 24, 1970

3,502,746
PRODUCTION OF CONJUGATED DIENE POLYMERS AND BLOCK COPOLYMERS FROM DILUTE MONOMER FEED STREAMS
John M. Miles, Bartlesville, Okla., assignor to Phillips Petroleum Company, a corporation of Delaware
No Drawing. Filed Dec. 9, 1965, Ser. No. 512,814
Int. Cl. C08d 1/20, 1/32
U.S. Cl. 260—880
4 Claims

ABSTRACT OF THE DISCLOSURE

A method for polymerizing impure conjugated diene streams at relatively high temperatures and at relatively low solvent-to-monomer ratios is provided without reaching the upper cloud point of the polymerization reaction mixture.

The polymers are produced by charging the low concentration conjugated diene feed stream to the polymerization zone with a solvent and an organolithium initiator and thereafter allowing the polymerization to proceed under adiabatic conditions until substantially all of the conjugated diene has polymerized. At the conclusion of the polymerization of the conjugated diene, the polymerization zone is vented thereby allowing at least a portion of the other components in the feed stream to escape. This venting cools the reaction mixture in the polymerization zone. At the conclusion of the venting step, additional monomer is added to the polymerization zone and the reaction is allowed to continue until the additional monomer has polymerized. Because of the cooling effect of the venting step, the upper cloud point of the polymerization mixture is not reached in the second polymerization step.

---

This invention relates to the production of polymers, especially rubbery polymers, of conjugated dienes. In one aspect it relates to the production of such polymers from impure starting materials. In another aspect, this invention relates to a process for the production of conjugated diene polymers wherein the polymerization mixture is maintained at a temperature below the upper cloud point.

It is known in the prior art to produce rubbery polymers from conjugated dienes by the use of organo lithium compounds as initiators. It is also known that this polymerization reaction can be conducted in the presence of various other compounds such as paraffinic hydrocarbons and monoolefins which have no deleterious effect on the polymerization initiators. Several different processes have been suggested in the prior art for the production of polymers of conjugated dienes from low purity conjugated diene streams, such as petroleum refinery streams obtained by various cracking processes.

Such low purity conjugated diene streams usually contain materials that are deleterious to the polymerization reaction, such as alkynes and the like. These deleterious hydrocarbons can be converted to nondeleterious hydrocarbons or separated from the feed stream by fractional distillation. After the conjugated diene stream has been so treated it can then be charged to a conventional polymerization system for polymerization in the presence of such initiators as organolithium compounds. However, it has been found that in such polymerization reactions, using the low purity conjugated diene feed stream, certain problems with respect to phase separation of the polymerization mixture occur.

When relatively low solvent-to-monomer ratios have been employed in the polymerization of the low purity conjugated diene streams, the exothermic polymerization reaction often causes the temperature of the polymerization reaction mixture to rise above the upper cloud point of the polymer solution present, thereby precipitating a viscous, sticky polymer-rich phase in the polymerization reactor. This polymer-rich phase tends to stick to and foul processing equipment and is most undesirable. The upper cloud point temperature is that point known in the art as the temperature above which the solvent employed can no longer dissolve the polymer formed. The result in exceeding the upper cloud point temperature is the formation of a polymer-rich phase separate from the solvent phase. Since it is desirable to use low solvent-to-monomer ratios in polymerization systems, in order to reduce the size of the equipment used in the polymerization reaction and solvent recovery steps, it is necessary to keep the temperature of the polymerization reaction mixture below the upper cloud point.

Because of the exothermic nature of the polymerization reaction, it is difficult to control the temperature of the polymerization reaction mixture and keep it below the upper cloud point. It has been suggested to start the polymerization at a very low temperature and allow it to proceed exothermically, thereby preventing the polymerization mixture from reaching the upper cloud point. This answer to the problem has proved unsatisfactory in commercial operations because the polymerization rate is so slow at low temperatures.

I am aware of the problems associated with the production of polymers from low concentration conjugated diene streams and have discovered a process wherein the polymerization can be carried out at relatively low solvent-to-monomer concentrations and at reasonably high temperatures without exceeding the upper cloud point of the polymer solution.

An object of this invention is to produce polymers, especially rubbery polymers, from impure conjugated diene streams. Another object of my invention is to produce said polymers at relatively low solvent-to-monomer ratios. A further object is to produce such polymers at relatively high temperatures without exceeding the upper cloud point of the polymer solution. Other objects and advantages will be apparent to those skilled in the art upon studying this disclosure.

According to this invention, rubbery polymers of conjugated dienes can be produced from low purity hydrocarbon streams containing a mixture of conjugated dienes together with paraffinic hydrocarbons and monoolefins. The polymers can be produced at relatively high temperatures without exceeding the upper cloud point of the polymer solution by charging the low concentration conjugated diene feed stream to the polymerization zone with a solvent and an organolithium initiator and thereafter allowing the polymerization to proceed under adiabatic conditions until substantially all of the conjugated diene has polymerized. At the conclusion of the polymerization of the conjugated diene, the polymerization zone is vented thereby allowing at least a portion of the other components in the feed stream to escape. This venting cools the reaction mixture in the polymerization zone. At the conclusion of the venting step, additional monomer is added to the polymerization zone and the reaction is allowed to continue until the additional monomer has polymerized. Because of the cooling effect of the venting step, the upper cloud point of the polymerization mixture is not reached in the second polymerization step.

My improved process is applicable to the polymerization of feed streams wherein the conjugated diene can be present in an amount of from 20 to 80 parts by weight per 100 parts of the feed stream. The conjugated dienes that are polymerized by the process of my invention are generally those having from 4 to 6 carbon atoms per molecule. These include 1,3-butadiene, 1,3-pentadiene, 1,3-hexadiene and isoprene. 1,3-butadiene is most frequently used on account of its commercial availability. The remaining portion of the feed stream can contain a variety of products. Usually the remainder of the feed stream will be paraffinic hydrocarbons and monoolefins.

I have found that feed streams such as a refinery stream obtained by the cracking of naphtha are especially applicable to the process of my invention. However, generally the refinery streams obtained by the cracking of naphtha are unacceptable for polymerization in accordance with my invention without pretreating them to remove certain deleterious materials or treating the stream to convert them to nondeleterious materials. Any method known in the art for removing the deleterious materials can be used. For example, the stream may be selectively hydrogenated to saturate such materials as acetylenes that are present in the naphtha cracking stream. After the selective hydrogenation, the feed stream may be subjected to fractional distillation wherein such materials as nonconjugated dienes are removed. At the conclusion of the treatment to remove or convert the deleterious materials, the feed stream will have a composition that can be easily polymerized in accordance with my invention.

The initiators that are used in the process of this invention are organolithium compounds. Suitable organolithium initiators can be represented by the formula $RLi_x$ wherein R is selected from the group consisting of aliphatic, cycloaliphatic and aromatic hydrocarbon radicals containing from 1 to 20 carbon atoms and $x$ is an integer in the range of 1 to 4. These materials are well known in the polymerization art. Specific compounds of this class that are used as initiators in this invention include the following: methyllithium, n-butyllithium, n-amyllithium, n-decyllithium, phenyllithium, 1,4-dilithio-2-butene, 1,4-dilithiocyclohexane, lithium adducts of naphthalene and methylnaphthalene, and the like. The amount of initiator that is used in the polymerization system can vary over a wide range. Generally, the initiator will be present in an amount of from about 0.05 to 5 weight percent, based on the total monomers charged to the polymerization system.

The polymerization according to this invention is usually conducted at a temperature in the range of from about −20 to 150° C. and most frequently within the range of from about 25 to 125° C. The pressure can vary over a wide range and need be only sufficient to maintain at least a portion of the conjugated diene in the liquid phase in the polymerization zone.

The polymerization is carried out in the presence of an inert diluent, preferably a hydrocarbon which is liquid and inert under the reaction conditions. Suitable diluents are paraffinic, cycloparaffinic and aromatic hydrocarbons such as isopentane, n-hexane, the isooctanes, cyclopentane, cyclohexane, benzene, toluene, xylenes, the dimethylcyclohexanes, and the like. The weight ratio of said diluent to the monomer feed stream is in the range of 1:1 to 6:1.

In the process of my invention, I have found that it is most desirable to charge the initiator, the polymerization diluent and the conjugated diene feed stream, containing various nondeleterious impurities such as butenes, butanes and the like, to the polymerization zone together. At the completion of the addition of these components to the polymerization zone, the polymerization zone is usually closed and the polymerization is allowed to take place adiabatically under autogenous pressure. In some instances, especially at higher temperatures, it may be desirable to pressurize the polymerization zone with an inert gaseous material such as butene, butane, nitrogen and the like or to operate the reactor liquid-full under high pump pressure. Sufficient pressure is maintained in the polymerization zone to ensure a liquid phase of the reactants.

In commercial operations, it is desirable that the polymerization be initiated at a sufficiently high temperature to ensure a reasonably rapid polymerization of the monomers present in the system. However, the temperature for initiating the polymerization cannot be so high as to allow the polymerization mixture to exceed its upper cloud point during the polymerization reaction. The upper cloud point is of course a function of several variables such as the purity of the monomer feed stream, the type of impurities in the monomer feed stream, the polymerization diluent used, and the like.

After the initial reactants have been charged to the polymerization zone, the mixture is allowed to polymerize under adiabatic conditions. Because of the exothermic nature of the polymerization reaction, the temperature and the pressure will rise in the polymerization zone. After substantially all of the conjugated diene in the initial charge to the polymerization zone has polymerized, the polymerization zone will be vented. In the venting process, the gaseous butanes, butenes, and a small portion of the polymerization diluent will escape from the polymerization zone, thus lowering the temperature of the polymerization mixture. The exact amount of the components that are vented from the polymerization zone will be determined by the degree of cooling desired in the polymerization reaction zone. It must be emphasized that the polymerization reaction mixture is cooled to a sufficient degree so as to prevent the polymerizate to approach its upper cloud point upon the subsequent addition and polymerization of additional monomer. In some instances, it may be desirable to vent all of the butanes, butenes, and the like from the system to achieve the desired cooling before the additional monomer is introduced into the polymerization zone.

My process provides for the polymerization of impure conjugated diene feed streams with the subsequent recovery of the various hydrocarbon impurities from the feed stream by a subsequent venting from the polymerization reactor. Thus, there is no need to separate the conjugated diene from the hydrocarbon feed stream prior to the polymerization reaction because the conjugated diene will be polymerized in the polymerization zone and the substantially pure paraffin and 1-olefin stream can be recovered by merely venting the polymerization zone.

After the polymerization zone has been vented and the desired cooling has been achieved, additional monomer can be charged to the polymerization zone and the polymerization can be carried out to completion. The additional monomer that is charged to the polymerization zone can be more conjugated diene or it can be different monomer such as vinyl-substituted aromatic compounds. Thus my invention is applicable to the production of homopolymers of conjugated dienes, copolymers of conjugated dienes, and block copolymers of conjugated dienes with vinyl-substituted aromatic compounds. The vinyl-substituted aromatic compounds utilized in my invention are generally those having from 8 to 20 carbon atoms per molecule. Examples of these include styrene, methylstyrene and vinyl naphthalenes. Styrene is most frequently used, because of its commercial availability.

After the second monomer is charged to the polymerization zone, the polymerization zone is sealed and the polymerization of the second monomer is allowed to proceed adiabatically under autogenous pressure. As in the first polymerization reaction, the second polymerization reaction is exothermic. Therefore, the temperature and pressure inside the polymerization reactor will rise during the second polymerization. However, because of the prior venting and cooling of the polymerization reactor contents, the temperature of the second polymerization, upon completion, can be kept below its upper cloud point. Preferably the second monomer mill be charged at a temperature lower than the temperature in the polymerization zone. This procedure will provide for additional cooling in the polymerization zone.

My invention provides a method whereby various polymers of conjugated dienes can be produced in a batch polymerization system with a minimum of expensive equipment. By utilizing my invention, it is now possible to polymerize impure conjugated diene streams relatively high temperatures, relatively low solvent-to-monomer ratios, without approaching the upper cloud point of the polymerization reaction mixture. These advantages are not known in the prior art without the addition of complex and expensive refrigeration equipment, control equipment and the like. According to my invention, by merely observing the temperature inside of the reaction vessel, it is possible to determine when substantially all of the conjugated diene has polymerized in the initial charge of the impure conjugated feed stream. I have found that when the temperature "peaks," substantially all of the conjugated diene has polymerized. The reactor can then be vented to lower the temperture of the contents of the polymerization reactor. Then, additional monomer can be added to the polymerization zone, and the second polymerization step carried out.

At the conclusion of the polymerization reaction, the polymerizate can be treated in a variety of ways to recover the polymer and the polymerization diluent. Various methods are known in the art for recovering the polymer. One example is by the coagulation of the polymer with isopropyl alcohol. The recovery of the polymers from the polymerization diluent is well known in the art and will not be discussed at length here.

The following example illustrates one preferred embodiment of my invention. The example is included to illustrate the process of my invention and should not be construed to unduly limit the scope of my invention as described herein.

EXAMPLE

A petroleum fraction derived from a naphtha cracking process was treated to convert deleterious hydrocarbons to nondeleterious materials for the polymerization reaction. After the selective hydrogenation, the fraction was passed through a fractional distillation unit to remove the deleterious hydrocarbons that were not hydrogenated. The thus treated feed stream had a composition of 36 weight percent 1,3-butadiene, 63 weight percent butanes and butenes, and 1 percent lighter and heavier hydrocarbon components that are nondeleterious to the polymerization reaction. The following recipe was used for the initial polymerization of the impure butadiene feed stream:

| | Parts by weight |
|---|---|
| 1,3-butadiene | 75 |
| Butanes and butenes | 130 |
| Lighter and heavier components | 2 |
| n-Hexane | 670 |
| n-Butyllithium | 0.2 |

After the above components were charged to the polymerization reactor, the reactor was allowed to stand under adiabatic conditions. During the course of the adiabatic polymerization, the pressure rose from 26 p.s.i.a. to 72 p.s.i.a. and the temperature rose from 120° F. to 210° F. When it was observed that the maximum temperature was 210° F., approximately 60 parts by weight of the reactor contents were vented as vapor to the atmosphere. After the venting, the temperature in the reactor was 190° F. Twenty-five parts by weight of styrene were then added to the polymerization reactor. The styrene was added at a temperature of 120° F. The reactor was then allowed to stand under adiabatic conditions while the styrene polymerization took place. At the completion of the styrene polymerization, the temperature in the reactor was 205° F. and the pressure was 57 p.s.i.a. During the above polymerization steps, the upper cloud point of the polymerization mixture was not reached. The polymerization mixture was coagulated with an isopropyl alcohol and water solution and a rubbery polymer was recovered.

A second run was carried out using the same procedure as shown above except for the venting step. After the initial polymerization step was completed, i.e., when the temperature in the reactor peaked at 210° F. and the pressure reached 72 p.s.i.a., the styrene was charged without venting the reactor. The styrene was allowed to polymerize and at the end of the styrene polymerization, the final temperature in the reactor was 220° F. During the styrene polymerization, the upper cloud point of the reaction mixture was exceeded and a distinct phase separation occurred with the final polymer product being present in a sticky viscous layer in the polymerization reactor. This made it difficult to discharge the polymer from the reactor.

The foregoing runs show the improvements that can be achieved over the prior art methods of polymerization by using my invention. As shown in comparison of Runs 1 and 2, it is possible to carry out the polymerization of impure butadiene streams at relatively low solvent-to-monomer ratios, and at relatively high polymerization rates, without exceeding the upper cloud point of the polymerization mixture.

Various modifications can be made in the above described process without departing from the scope of the invention.

I claim:
1. In a method for producing conjugated diene polymers from a low purity conjugated diene fraction comprising a mixture of conjugated dienes containing from about 4 to 6 carbon atoms per molecule and aliphatic hydrocarbons selected from paraffins and monoolefins including butanes and butenes wherein said fraction comprises about 20 to 80 parts by weight conjugated diene per 100 parts of said fraction the improvement which comprises:
(A) charging said fraction to a polymerization zone wherein sufficient pressure is maintained so that at least a portion of said conjugated diene is in the liquid phase with a solvent and an organolithium initiator to form a first reaction mixture wherein the weight ratio of said solvent to said fraction is in the range of from about 1:1 to 6:1;
(B) allowing said first reaction mixture to stand under adiabatic conditions such that substantially all of said conjugated diene polymerizes and wherein the initial temperature at which the polymerization is begun is from about 77 to 120° F.;
(C) venting said polymerization zone and sufficiently releasing said pressure to remove at least the butanes and butenes and thereby cooling said first reaction mixtures;
(D) charging a second monomer to the thus cooled first reaction mixture, to form a second reaction mixture, said second monomer being selected from the group consisting of conjugated dienes containing from about 4 to 6 carbon atoms per molecule, vinyl-substituted aromatic compounds containing from about 8 to 20 carbon atoms per molecule and mixtures thereof;
(E) allowing said second reaction mixture to stand under adiabatic conditions such that substantially all of said second monomer is polymerized and such that the upper cloud point of said second reaction mixture is not reached at the completion of the polymerization of said second monomer; and
(F) recovering the polymer thus produced.

2. The method of claim 1 wherein said fraction comprises a mixture of 1,3-butadiene, butanes and butylenes, said solvent is n-hexane and said second monomer is styrene.

3. The method of claim 2 wherein said fraction comprises a mixture of about 20 to 80 parts by weight 1,3-butadiene and about 20 to 80 parts by weight butanes and butylenes, and the weight ratio of n-hexane to said fraction is in the range of from 1:1 to 6:1.

4. The method of claim 1 wherein said solvent comprises paraffins, cycloparaffins, or aromatic hydrocarbons containing from five to eight carbon atoms per molecule and wherein 100 parts by weight of said low purity conjugated diene fraction comprises 80 to 20 parts by weight of butanes and butenes and 20 to 80 parts by weight 1,3-butadiene.

References Cited

UNITED STATES PATENTS

| 3,062,796 | 11/1962 | Greene et al. | 260—88.2 |
| 3,140,278 | 7/1964 | Kuntz | 260—94.2 |
| 3,149,182 | 9/1964 | Porter | 260—879 |
| 3,349,070 | 10/1967 | Thayer. | |

FOREIGN PATENTS 520,873  1/1956  Canada.

SAMUEL H. BLECH, Primary Examiner

K. E. KUFFNER, Assistant Examiner

U.S. Cl. X.R.

260—94.2, 879